(12) United States Patent
Hori et al.

(10) Patent No.: US 6,443,275 B1
(45) Date of Patent: Sep. 3, 2002

(54) POWER TRANSMISSION APPARATUS FOR A VEHICLE

(75) Inventors: Yoshiaki Hori; Takashi Shichinohe; Tohru Nishi; Noriaki Takano, all of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/678,090

(22) Filed: Oct. 4, 2000

(30) Foreign Application Priority Data

Oct. 5, 1999 (JP) .............................. 11-284207

(51) Int. Cl.[7] .................. B60K 41/22; F16H 59/00
(52) U.S. Cl. .................. 192/3.33; 192/3.58; 192/3.61; 74/732.1
(58) Field of Search .................. 192/3.21, 3.33, 192/3.58, 3.61, 3.62, 3.63; 74/732.1; 180/292, 337, 364

(56) References Cited

U.S. PATENT DOCUMENTS 4,981,202 A * 1/1991 Leigh-Monstevens et al. ... 192/3.58
5,515,940 A * 5/1996 Shichinohe et al. ......... 180/292
5,542,309 A * 8/1996 Wenger et al. ............. 74/337.5
5,590,563 A * 1/1997 Kuwahata et al. .......... 74/337.5

FOREIGN PATENT DOCUMENTS

JP        A11-82734        3/1999

* cited by examiner

Primary Examiner—Richard M. Lorence
(74) Attorney, Agent, or Firm—Birch, Stewart, Kolasch & Birch, LLP (57) ABSTRACT

In a power transmission apparatus for a vehicle having a gear transmission capable of transmitting power from a crankshaft of an engine to driving wheels by selectively establishing a plurality of shift stages of gear trains and a clutch for cutting power transmission from the crankshaft to the gear transmission in operating to shift the power transmission, when the clutch is operated to cut or connect in cooperation with the shift operation of the gear transmission, shift operability is promoted while avoiding an increase in weight. A gear transmission is shifted by a first actuator and a clutch is driven by a second actuator which is independent of the first actuator.

9 Claims, 10 Drawing Sheets

POWER TRANSMISSION APPARATUS FOR A VEHICLE

BACKGROUND OF THE INVENTION

1. Field of the Invention

The present invention relates to a power transmission apparatus for a vehicle having a gear transmission capable of transmitting power from a crankshaft of an engine to driving wheels by selectively establishing a plurality of stages of gear trains and a clutch for cutting power transmission from the crankshaft to the gear transmission when shifting the gear transmission. In particular, the present invention relates to an improvement in a power transmission apparatus for shifting a gear transmission by an actuator such as an electric motor.

2. Description of Background Art

There has already been known a power transmission apparatus for shifting a gear transmission by an actuator such as a motor in, for example, Japanese Patent Laid-Open No. H11-82734.

According to the construction of the above-identified reference, in order to facilitate speed shift operation of a vehicle driver such that a clutch is automatically cut in cooperation with shifting of a gear transmission, a shift change mechanism provided to the gear transmission and a clutch are mechanically connected by a link mechanism or the like.

However, when the shift change mechanism and the clutch are mechanically cooperated by the link mechanism or the like, by an increase in clutch load accompanied by an increase in displacement of an engine mounted to a vehicle, an increase in weight caused by an increased in rigidity of the link mechanism or the like may result or a deterioration in shift operability accompanied by an increase in shift load or shift operation stroke in the shift change mechanism may result.

SUMMARY OF THE INVENTION

The present invention has been carried out in view of such a situation and it is an object thereof to provide a power transmission apparatus for a vehicle which promotes shifting while avoiding an increase in weight when operating to engage or disengage a clutch in cooperation with shifting of a gear transmission.

In order to achieve the above-described object, a first aspect of the present invention includes a power transmission apparatus for a vehicle having a gear transmission capable of transmitting power from a crankshaft of an engine to driving wheels by selectively establishing a plurality of shift stages of gear trains and a clutch for cutting power transmission from the crankshaft to the gear transmission when shifting the gear transmission, the power transmission apparatus including a first actuator for shifting the gear transmission and a second actuator for driving the clutch independently of the first actuator.

According to such a construction, the gear transmission and the clutch are not mechanically connected. Accordingly, even when clutch load is increased in accordance with an increase in displacement of an engine, it is not necessary to increase the rigidity of a link mechanism or the like and an increase in weight can be avoided. Furthermore, the clutch load does not influence the shift load or shift operation stroke and accordingly, the shift operability can be promoted.

Furthermore, a second aspect of the present invention includes, in addition to the construction of the first aspect of the present invention, an input shaft capable of inputting the power from the crankshaft and rotatably supported by a crankcase. The clutch operated by hydraulic pressure is mounted to one end portion of the input shaft projecting from the crankcase. Furthermore, a clutch control valve capable of controlling the hydraulic pressure provided to the clutch and constituting a portion of the second actuator is provided at a cover covering the clutch and coupled to the crankcase. According to such construction, the clutch and the clutch control valve are arranged at positions proximate to each other and operational response of the clutch by operation of the clutch control valve can be promoted.

A third aspect of the present invention includes, in addition to the construction of the second aspect of the present invention, a control unit for controlling a solenoid provided to the clutch control valve and controlling an electric motor constituting the first actuator. According to such a construction, the clutch control valve and the electric motor are electrically controlled and it is facilitated to operate the clutch in cooperation with shift operation of the gear transmission.

Furthermore, a fourth aspect of the present invention includes, in addition to the construction of the second or third aspects of the present invention, a torque converter covered by the cover is provided at one end portion of the crankshaft and a torque converter control valve for controlling hydraulic pressure provided to the torque converter is provided at the cover. According to such a construction, the clutch control valve and the torque converter control valve are provided at the cover, pressure leakage inspection at the two control valves can be carried out concentratedly on the side of the cover, which can contribute to promotion of productivity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

An explanation will now be given of embodiments according to the present invention with reference to the attached drawings as follows.

Figure 1:
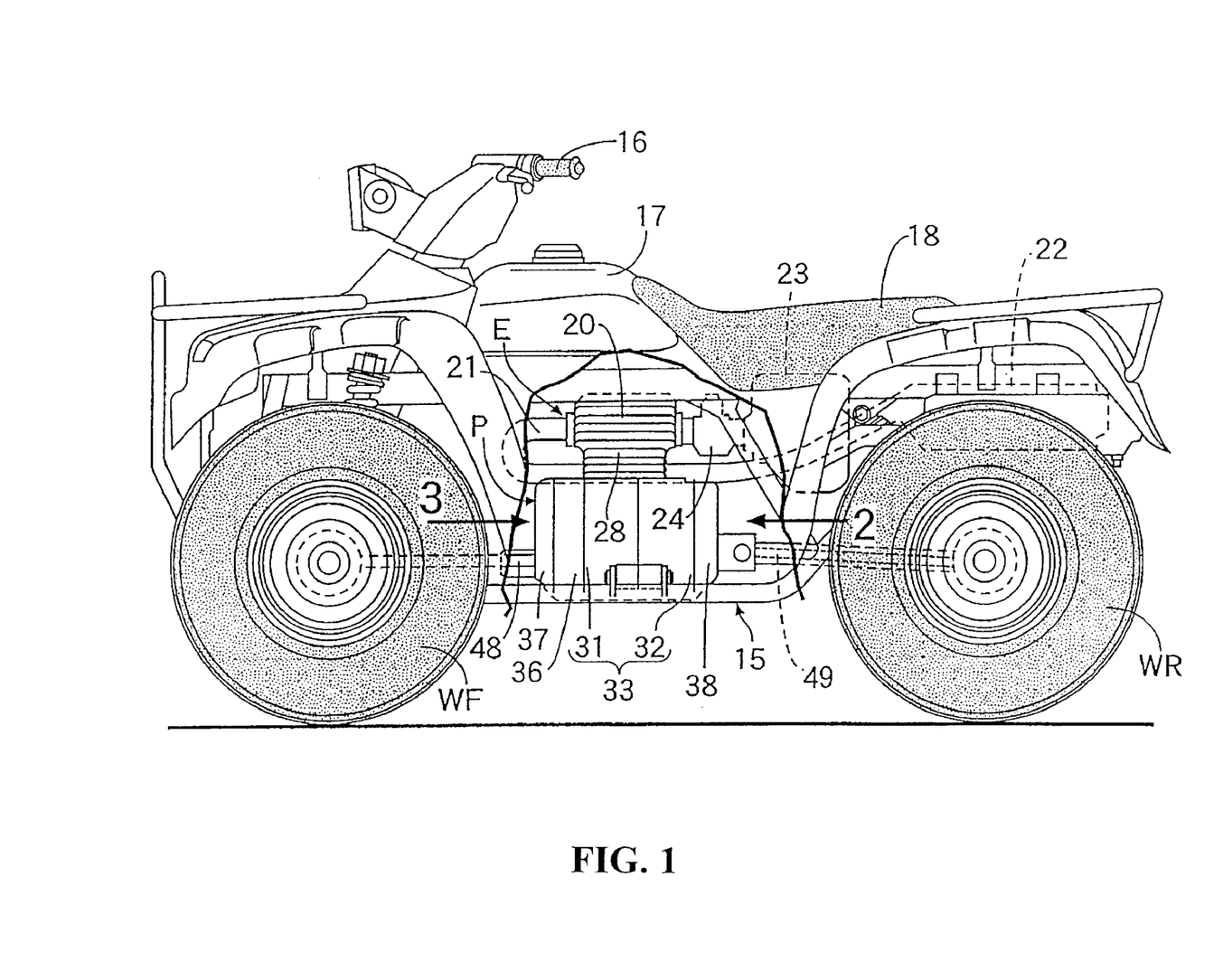
FIG. 1 is a side view of an all terrain saddle type vehicle according to a first embodiment of the present invention.
Figure 2:
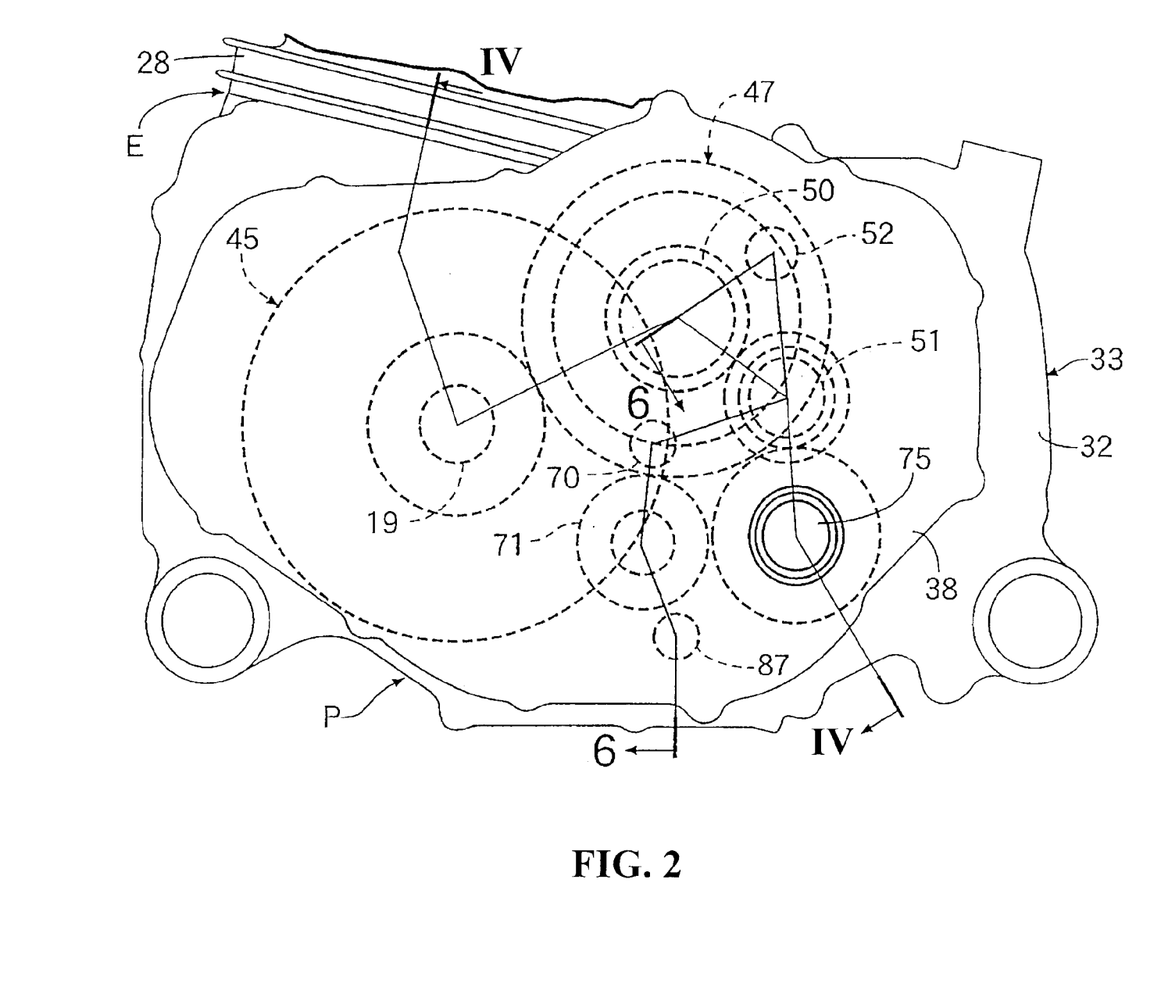
FIG. 2 is a simplified enlarged view of a power unit in the direction of an arrow 2 in FIG. 1.
Figure 3:
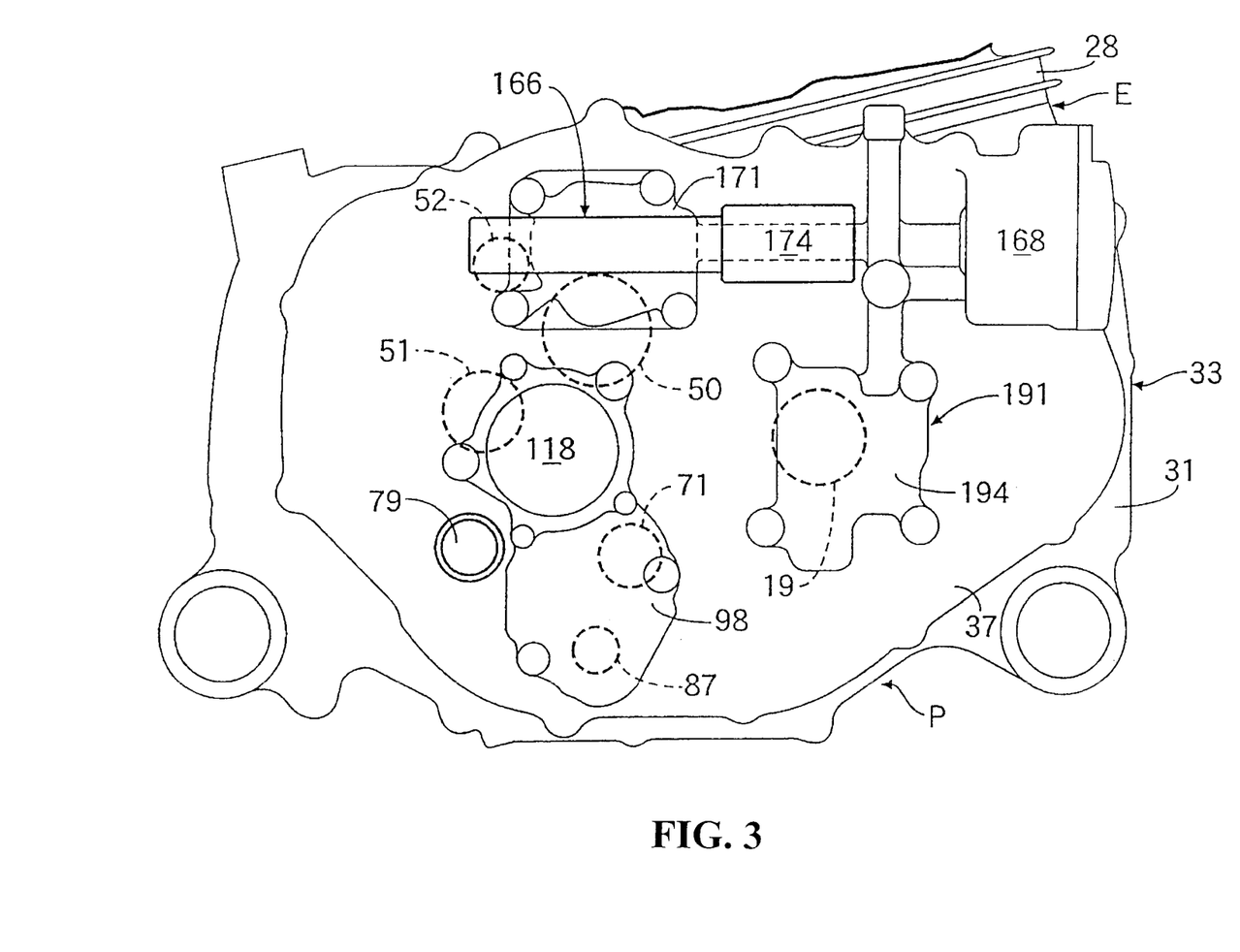
FIG. 3 is a simplified enlarged view of the power unit in the direction of an arrow 3 in FIG. 1.
Figure 4:
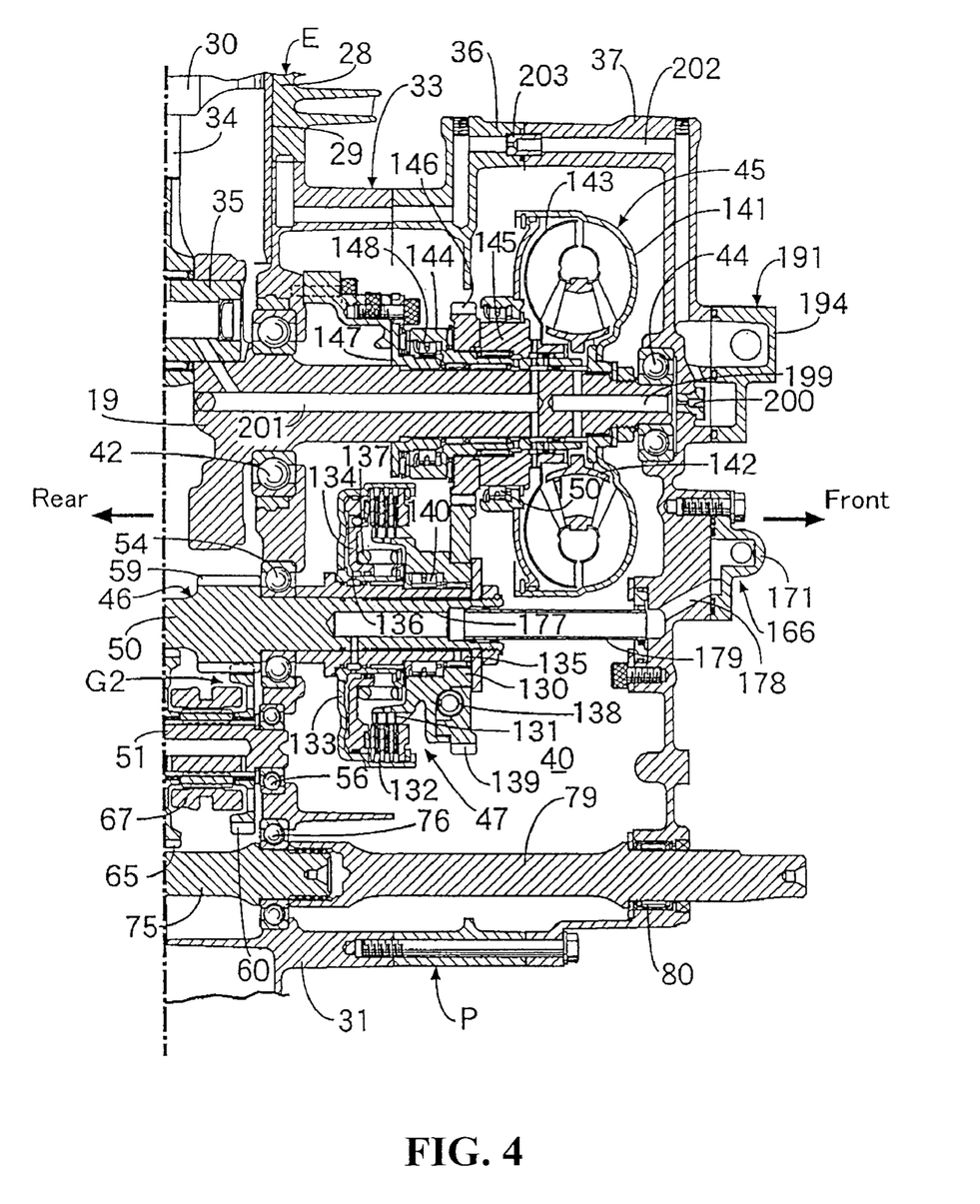
FIG. 4 is a sectional view showing a front half portion of a section taken along a line IV—IV of FIG. 2.
Figure 5:
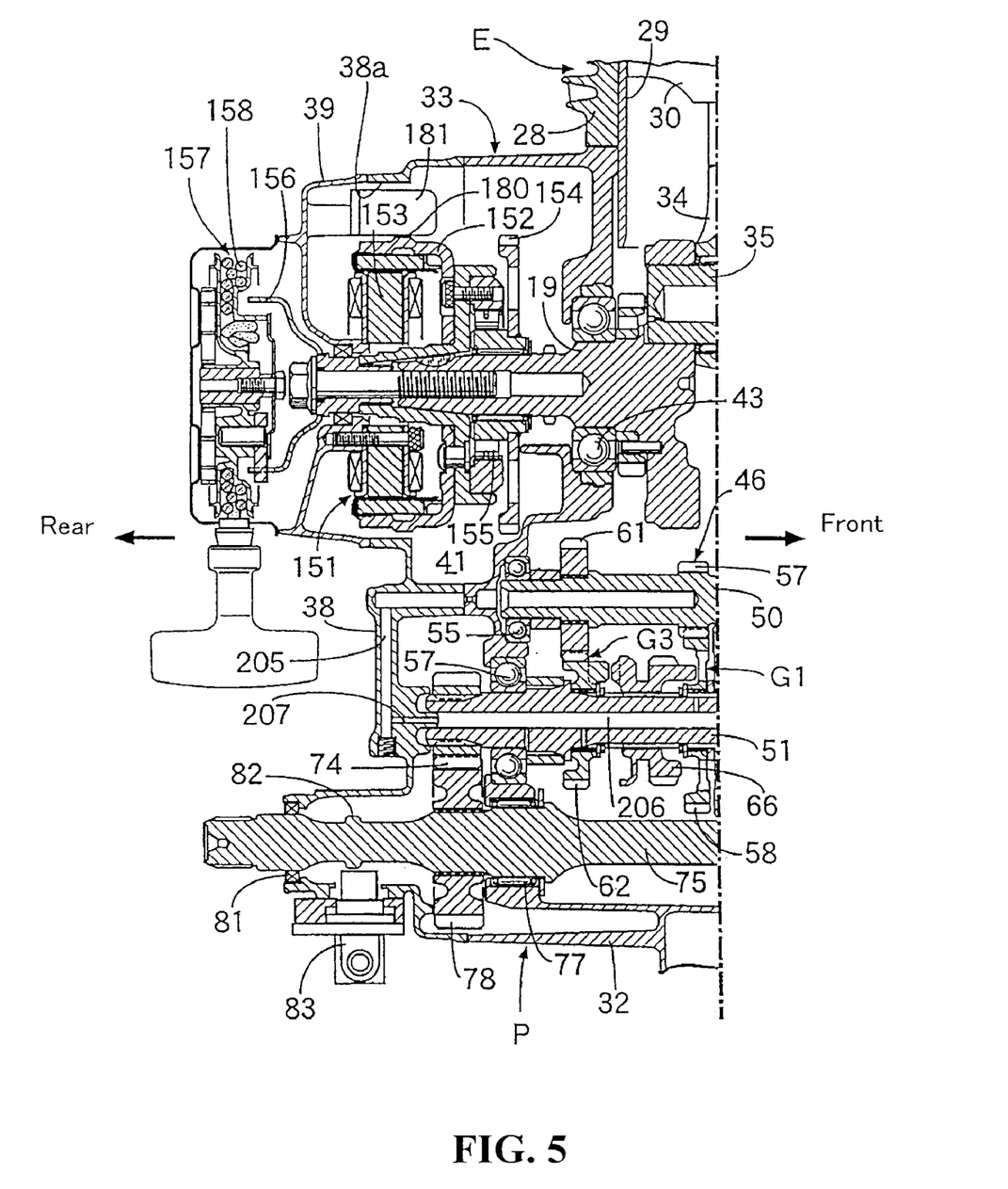
FIG. 5 is a sectional view showing a rear half portion of the section taken along the line IV—IV of FIG. 2.
Figure 6:
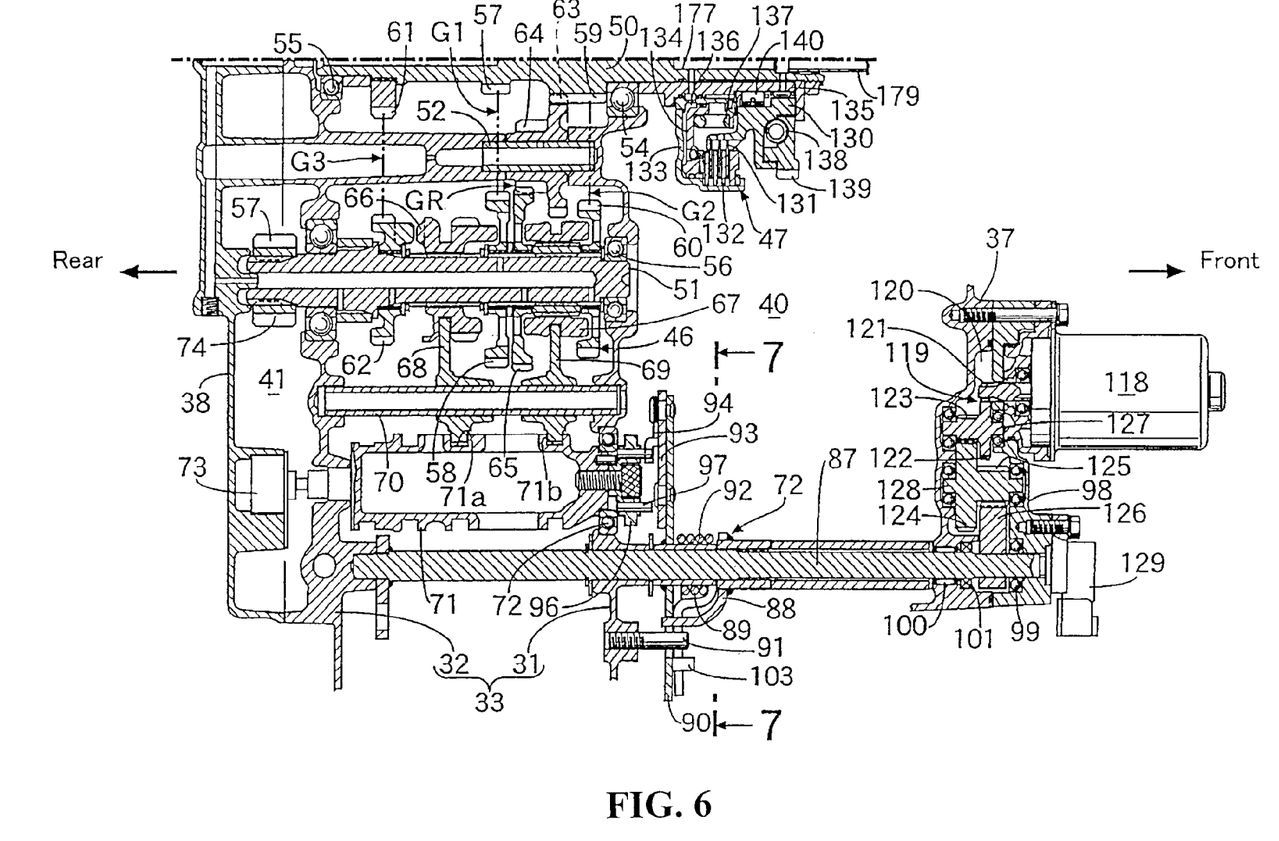
FIG. 6 is a sectional view taken along a line 6—6 of FIG. 2.
Figure 7:
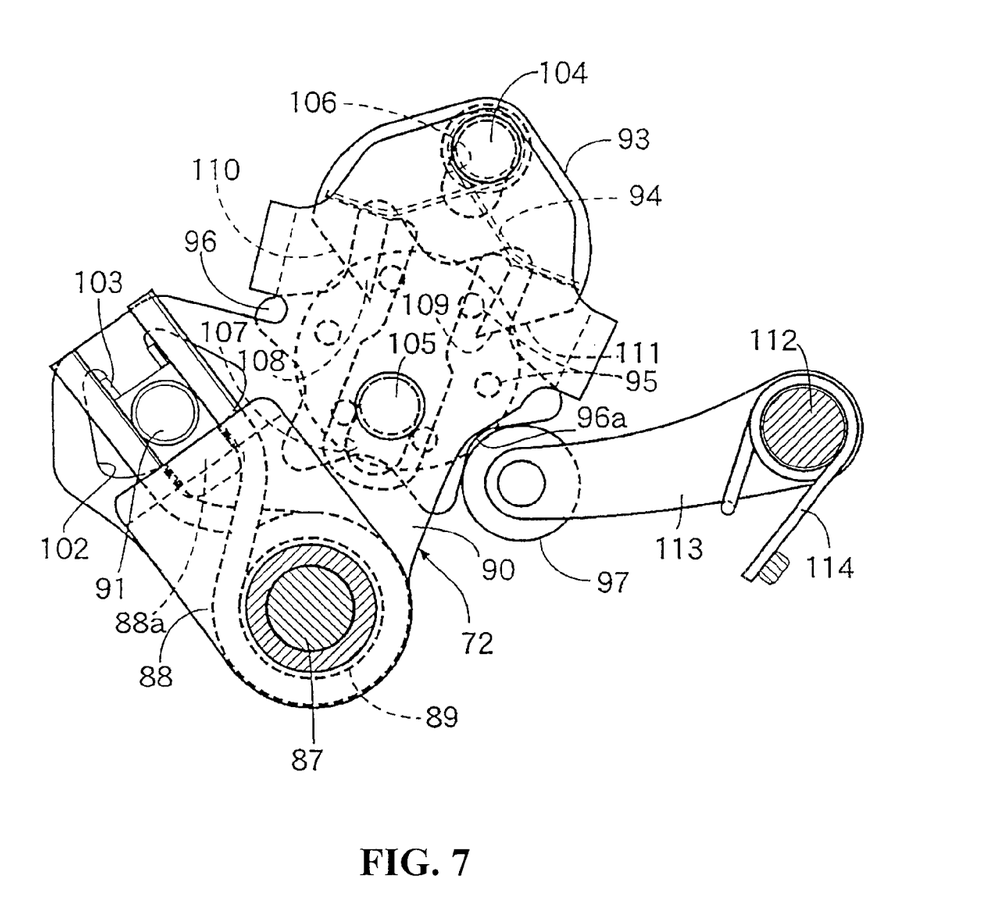
FIG. 7 is an enlarged sectional view taken along a line 7—7 of FIG. 6.
Figure 8:
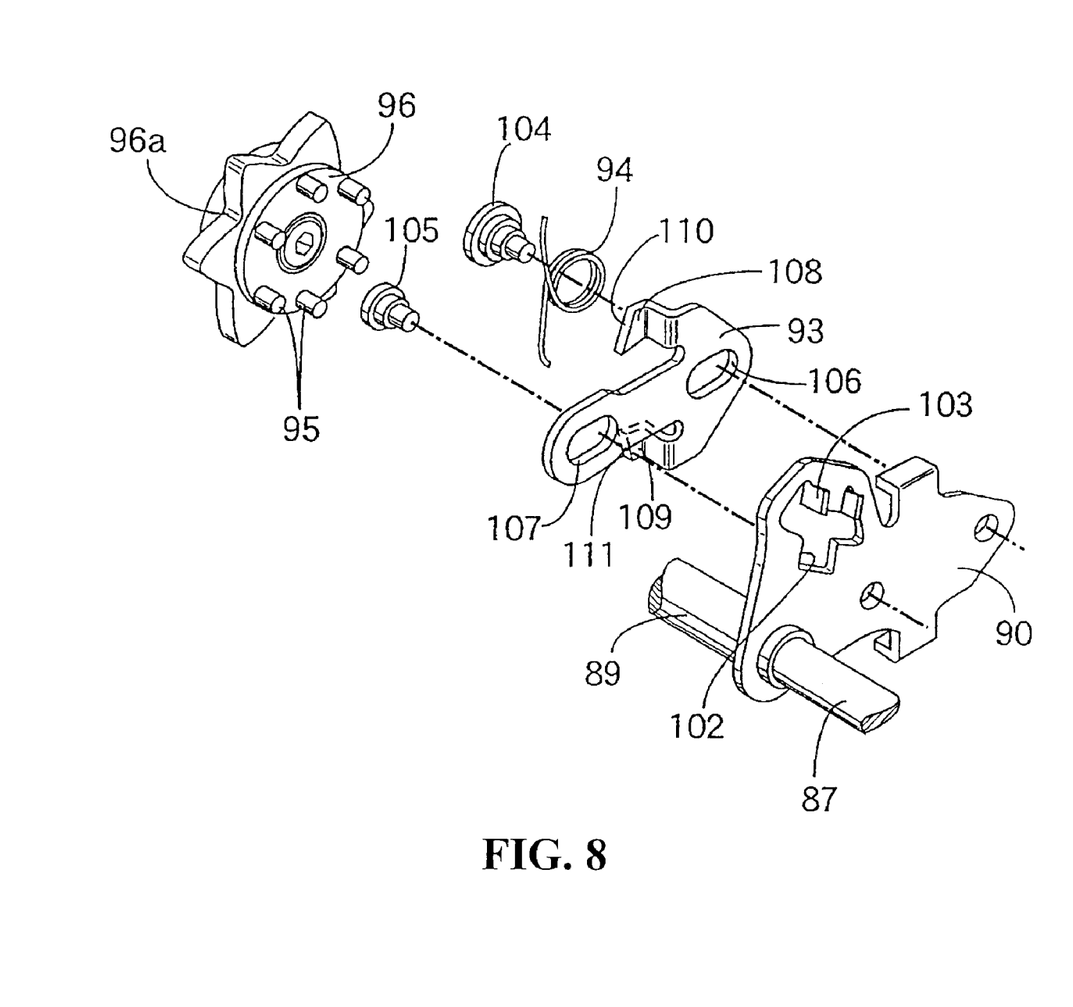
FIG. 8 is a disassembled perspective view of a portion of a shift change mechanism.
Figure 9:
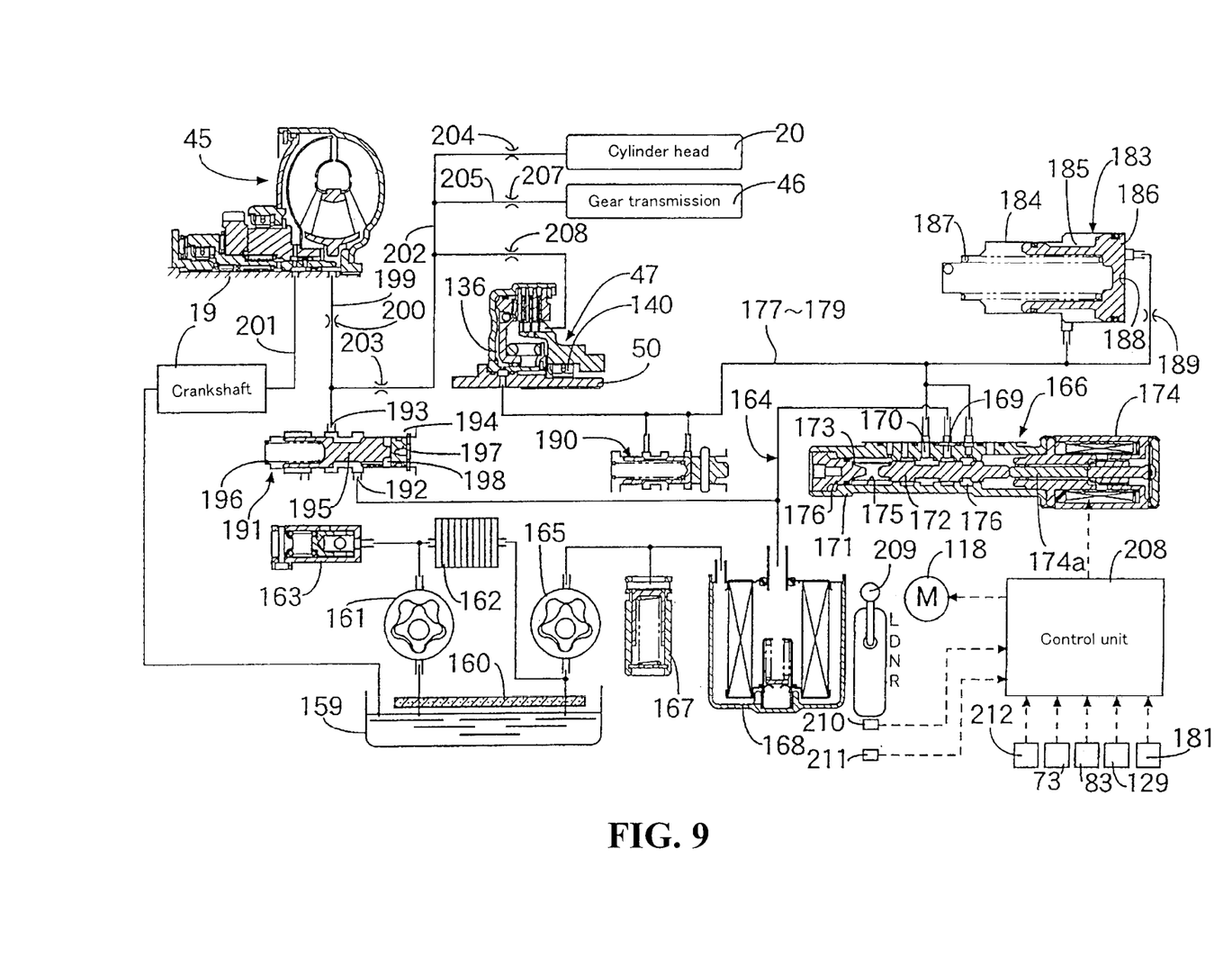
FIG. 9 is a hydraulic circuit diagram.

FIGS. 1–9 show a first embodiment of the present invention in which FIG. 1 is a side view of an all terrain saddle type vehicle, FIG. 2 is simplified enlarged view of a power unit in the direction of an arrow 2 direction in FIG. 1, FIG. 3 is a simplified enlarged view of the power unit viewed in the direction of an arrow 3 direction in FIG. 1, FIG. 4 is a sectional view showing a front half portion of a section taken along a line IV—IV of FIG. 2, FIG. 5 is a sectional view showing a rear half portion of the section taken along the line IV—IV of FIG. 2, FIG. 6 is a sectional view taken along a line 6—6 of FIG. 2, FIG. 7 is an enlarged sectional view taken along a line 7—7 of FIG. 6, FIG. 8 is a disassembled perspective view of a portion of a shift change mechanism and FIG. 9 is a hydraulic circuit diagram.

First, in FIG. 1, the all terrain saddle type vehicle is provided with a vehicle body frame 15 constituted by welding steel pipes. A pair of left and right front wheels WF are respectively mounted with balloon type low pressure tires and are suspended at a front portion of the vehicle body frame 15. A pair of left and right rear wheels WR are respectively mounted with balloon type low pressure tires and are suspended at a rear portion of the vehicle body frame 15. Furthermore, at a front end of the vehicle body frame 15, a steering handle 16 for steering the pair of left and right front wheels WF is arranged, a fuel tank 17 is arranged at a middle portion of the vehicle body frame 15 in the forward and rearward direction, and a saddle type seat 18 is arranged on a rear side of the fuel tank and at an upper portion of the vehicle body frame 15.

On lower sides of the fuel tank 17 and the seat 18, a power unit P is mounted on the vehicle body frame 15. The power unit P includes an engine E for driving the front wheels WF. Accordingly, the front wheels WF are steering wheels as well as driving wheels and the rear wheels WR are driving wheels. The engine E is arranged, for example, vertically by disposing a crankshaft 19 (refer to FIG. 2 through FIG. 6) in the forward and rearward direction of the saddle type vehicle. An exhaust pipe 21 communicating with an exhaust port (not illustrated) provided on the front side of a cylinder head 20 in the engine E, is bent by 180 degrees to the right side of the vehicle body frame 15, extends rearwardly on the right side of the power unit P, and is connected to an exhaust muffler 22 arranged on the rear side of the rear portion of the vehicle body.

An air cleaner 23 and a carburetor 24 connected to the air cleaner 23 are arranged on the rear side of the engine E and on the lower side of the seat 18. The carburetor 24 is connected to an intake port (not illustrated) provided on the rear side of the cylinder head 20.

Also with reference to FIGS. 2–5, a cylinder block 28 of the engine E is erected substantially vertically while being inclined slightly to the right side of the vehicle body. The cylinder head 20 is coupled to an upper portion of the cylinder block 28. Furthermore, a piston 30 is slidably fitted to a cylinder liner 29 provided in the cylinder block 28.

A lower portion of the cylinder block 28 is coupled with a crankcase 33 constituted by coupling together a front case half 31 and a rear case half 32 such that a lower portion of the cylinder liner 29 projects into the crankcase 33. The crankshaft 19, having an axial line along the forward and rearward direction of the saddle type vehicle, is rotatably supported by the crankcase 33 and the piston 30 is connected to the crankshaft 19 via a connecting rod 34 and a crankpin 35.

The front case half 31 is coupled with a front casing 36 formed in a cylindrical shape and extending toward the front side of the saddle type vehicle and a front cover 37 for closing a front end opening portion of the front casing 36 to thereby form a front operation chamber 40 between these parts and the front case half 31. Furthermore, the rear case half 32 is coupled with a rear casing 38 forming a rear operation chamber 41 between the rear casing 38 and the rear case half 32. The rear casing 38 is coupled with a rear cover 39 constituting a portion in correspondence with the crankshaft 19 and covering an opening portion 38a provided at the rear casing 38.

A ball bearing 42 is provided between the crankshaft 19 and the front case half 31. A ball bearing 43 is provided between the crankshaft 19 and the rear case half 32. Furthermore, a front end of the crankshaft 19 projecting from the front case half 31 to a side of the front operation chamber 40 is rotatably supported by the front cover 37 via a ball bearing 44.

The power unit P includes the engine E, a torque converter 45 mounted to the crankshaft 19 of the engine E, a gear transmission 46 capable of selectively establishing a plurality of shift stages of gear trains G1, G2, G3 and GR and a hydraulic type clutch 47 capable of cutting power transmission between the gear transmission 46 and the torque converter 45. Power outputted from the gear transmission 46 is transmitted to the left and right front wheels WF via a front propeller shaft 48 extending from the power unit P in the forward direction and a front differential apparatus (not illustrated), and is transmitted to the left and right rear wheels WR via a rear propeller shaft 49 extending from the power unit P in the rearward direction and a rear differential apparatus (not illustrated).

Also, with reference to FIG. 6, the gear transmission 46 is provided with an input shaft 50 and an output shaft 51 having axial lines in parallel with the crankshaft 19 and rotatably supported by the crankcase 33. Furthermore, a middle shaft 52 having an axial line in parallel with the crankshaft 19 is fixed to the crankcase 33.

A ball bearing 54 is provided between the input shaft 50 and the front case half 31 and a ball bearing 55 is provided between the input shaft 50 and the rear case half 32. A front end of the input shaft 50 projects from the front case half 31 to a side of the front operation chamber 40. Furthermore, a ball bearing 56 is provided between the output shaft 51 and the front case half 31, a ball bearing 57 is provided between the output shaft 51 and the rear case half 32, and a rear end of the output shaft 51 projects from the rear case half 32 to a side of the rear operation chamber 41.

A plurality of shift stages of gear trains G1, G2, G3 and GR provided to the gear transmission 46 are contained in the crankcase 33. Furthermore, the first speed gear train G1 includes a drive gear 57 formed integrally with the input shaft 50 and a driven gear 58 supported rotatably relative to the output shaft 51 and in mesh with the driving gear 57. The second speed gear train G2 includes a driving gear 59 integrally formed with the input shaft 50 and a driven gear 60 supported rotatably relative to the output shaft 51 and in mesh with the driving gear 59. The third speed gear train G3 includes a driving gear 61 fixed to the input shaft 50 and a driven gear 62 supported rotatably relative to the output shaft 51 and in mesh with the driving gear 61. Furthermore, the rear gear train GR includes the driving gear 59, a first middle gear 63 supported rotatably by the middle shaft 52 and in mesh with the driving gear 59, a second middle gear 64 integral with the first middle gear 63 and a driven gear 65 supported rotatably relative to the output shaft 51 and in mesh with the second middle gear 64.

A dog clutch member 66, for switching from first speed to third speed, is spline-fitted slidably in the axial direction to the output shaft 51 between the driven gear 58 of the first speed gear train G1 and the driven gear 62 of the third speed gear train G3. When the dog clutch member 66 for switching from first speed to third speed is engaged with the driven gear 58, the first speed gear train G1 is established, and when the dog clutch member 66 for switching from first speed to third speed is engaged with the driven gear 62, the third speed gear train G3 is established. Furthermore, a dog clutch member 67, for switching from second speed to reverse, is spline-fitted slidably in the axial direction to the middle shaft 51 between the driven gear 60 of the second speed gear train G2 and the driven gear 65 in the rear gear train GR. When the dog clutch member 67 for switching from second speed to reverse is engaged with the driven gear 60, the second speed gear train G2 is established, and when the dog clutch member 67 for switching from second speed to reverse is engaged with the driven gear 65, the rear gear train GR is established.

A shift fork 68 incorporating the dog clutch member 66 for switching from first speed to third speed and a shift fork 69 incorporating the dog clutch member 67 for switching from second speed to reverse, are slidably supported by a shift fork shaft 70 in the axial direction of the shift fork shaft 70. The shift fork shaft 70 has an axial line in parallel with the output shaft 51. The shift forks 68 and 69 are respectively engaged with cam grooves 71a and 71b provided at an outer periphery of a shift drum 71.

A front end portion of the shift drum 71 is supported by the front case half 31 via a ball bearing 72 and a rear end portion of the shift drum is supported directly by the rear case half 32. Furthermore, the shift drum 71 is pivoted by a shift change mechanism 72 connected to the front end portion of the shift drum 71. Accordingly, by sliding the shift forks 68 an 69 by pivoting the shift drum 71, one of the respective gear trains G1 through G3 and GR is selectively established.

A pivotal position of the shift drum 71, that is, a shift position is detected by a shift position detector 73 comprising a potentiometer. The shift position detector 73 is fixed to the rear casing 38 and is connected to a rear end of the shift drum 71.

A driving gear 74 is fixed to a rear end of the output shaft 51 in the rear operation chamber 41. Furthermore, a driving shaft 75 having an axial line in parallel with the output shaft 51 is rotatably supported by the crankcase 33 to interpose a ball bearing 76 between the driving shaft 75 and the front case half 31 and interpose a roller bearing 77 between the driving shaft 75 and the rear case half 32. The driving gear 74 is in mesh with a driven gear 78 fixed to a rear portion of the drive shaft 75 in the rear operation chamber 41.

The front end of the drive shaft 75 projects into the operation chamber 40 from the front case half 31. One end of a connecting shaft 79 is coaxially connected to the front end of the driving shaft 75 and a roller bearing 80 is interposed between the connecting shaft 79 and the front cover 37. Furthermore, the other end of the connecting shaft 79 projects forward from the front cover 37 and the front propeller shaft 48 is connected to the other end of the connecting shaft 79. Furthermore, a rear end of the driving shaft 75 projects rearward from the rear casing 38 while interposing a seal member 81 between the rear end and the casing 38. The rear propeller shaft 49 is connected to the rear end of the driving shaft 75.

In the rear operation chamber 41, an outer periphery of the driving shaft 75 is provided with a plurality of projections 82. The rear casing 38 includes a vehicle speed sensor 83 attached thereto for detecting vehicle speed based on the number of revolutions of the driving shaft 75 by detecting the projections 82.

Also in reference to FIG. 7 and FIG. 8, the shift change mechanism 72 is provided with a shift spindle 87 having an axial line in parallel with the shift drum 71. An arm 88 is fixed to the shift spindle 87. A change arm 90 is fixedly attached to a collar 89 mounted rotatably relative to an outer periphery of the shift spindle 87. A regulating pin 91 is fixedly attached to the front case half 31 and inserted in the change arm 90. A first torsional coil spring 92 is for exerting spring force to return the change arm 90 to a neutral position. A shifter plate 93 is capable of moving relative to the change arm 9 in a range restricted along the radius direction of the sheet spindle 87. A second torsional coil spring 94 exerts a spring force for urging the shifter plate 93 to an inner side of the radius direction. A pin plate 96 is fixed to a front end of the shifter drum 71 opposed to the shifter plate 93 and implanted with six pieces of feed pins 95. Furthermore, a roller 97 is urged by a spring in a direction of contact with an outer periphery of the pin plate 96.

A front end of the shift spindle 87 rotatably penetrates the front casing 37 and is supported by a gear case 98 fastened to the casing 37 via a ball bearing 99. A rear end of the shift spindle is rotatably supported by the rear case half 32 and extends forwardly in the operation chamber 40 by rotatably penetrating the front case half 31. Furthermore, a roller bearing 100 and a seal member 101 are interposed between the shift spindle 87 and the front casing 37.

The change arm 90 is provided with an opening portion 102 and a spring receiving portion 103 formed by folding an outer edge of the opening portion 102. Both end portions of the first torsional coil spring 92 supported by the collar 89 are brought into contact with both sides of the spring receiving portion 103 when the change arm 90 is disposed at the neutral position. Furthermore, a front end portion 88a of the arm 88 and the regulating pin 91 are inserted into the opening portion 102 between both end portions of the first torsional coil spring 92.

When the shift spindle 87 is pivoted in either of the regular and reverse directions when the change arm 90 is disposed at the neutral position, the front end portion 88a of the arm 88 is brought into contact with either of the left and right side edges of the opening portion 102 while flexing the first torsional coil spring 92 to thereby pivot the change arm 90 in either of regular and reverse directions. The change arm 90 is pivoted until the other of the left and right side edges of the opening portion 102 is brought into contact with the regulating pin 91. Furthermore, when power operated to the shift spindle 87 becomes "null", by the spring force exerted by the first torsional coil spring 92, the arm 88 and accordingly the shift spindle 87 and the change arm 90 return to the neutral position.

Guide pins 104 and 105 are respectively calked and fixed to the change arm 90 at two locations spaced apart from each other along a radius direction of the shift spindle 87. Meanwhile, the shifter plate 93 is formed with long holes 106 and 107 respectively inserted into and engaged with the guide pins 104 and 105 to prolong along the radius direction. The shifter plate 93 is supported by a face of the change arm 90 on the side of the shift drum 71 slidably along the radius direction of the shift spindle 87.

Feed claws 108 and 109 folded to the side of the shift drum 71 are provided on both sides of the shifter plate 93 and cams 110 and 111 are formed on outer sides of the feed claws 108 and 109.

The second torsional coil spring 94 is supported by the guide pin 104 which is an outer side one of the two guide pins 104 and 105. By bringing both end portions of the second torsional coil spring 94 into contact with the two feed claws 108 and 109 of the shifter plate 93, the shifter plate 93 is urged to an inner side along the radius direction of the shift spindle 87 relative to the change arm 90.

An outer periphery of the pin plate 96 is formed in a star shape having six recess portions 96a spaced apart from each other at equal intervals in the peripheral direction. The six feed pins 95 are implanted in the pin plate 96 such that two of the feed pins 95 are arranged between the two feed claws 108 and 109 of the shifter plate 93.

The roller 97 is axially supported by the other end of an arm 113, one end of which is pivotably supported by the front case half 31 via a support shaft 112. The spring force of a third torsional coil spring 114 provided between the front case half 31 and the arm 113 causes the arm 113 to urge the roller 97 in a direction of contact with the outer periphery of the pin plate 96.

According to the shift change mechanism 72, by pivotal movement of the change arm 90 in either of the regular and reverse directions in accordance with pivotal movement in either of the regular and reverse directions of the shift spindle 87, one of the two feed claws 108 and 109 of the shifter plate 93 is engaged with one of the feed pins 95 of the pin plate 93. Furthermore, the shift drum 71 is driven to pivot in either of the regular and reverse directions. In addition, when the change arm 90 returns to the neutral position by spring force exerted by the first torsional coil spring 92, by bringing one of the feed pins 95 of the pin plate 93 into contact with one of the cams 110 and 111 formed at the two feed claws 108 and 109 of the shifter plate 93, the shifter plate 93 is moved to an outer side in the radius direction of the shift spindle 87 against spring force of the second torsional coil spring 94 and one of the two feed claws 108 and 109 rides over one of the feed pins 95. Furthermore, the pivotal movement position of the pin plate 93 is held by engaging the roller 97 with one of the recess portions 86a of the outer periphery of the pin plate 96.

With reference particularly to FIG. 6, the shift spindle 87 of the shift change mechanism 72 is connected with an electric motor 118 rotatable in either of the regular and reverse directions via a reduction gear train 119.

The electric motor 118 is provided with an axial line in parallel with the shift spindle 87 and attached to the gear case 98. The reduction gear train 119 is contained in a gear chamber 120 formed between the front cover 37 and the gear case 98.

The reduction gear train 119 includes a first reduction gear 121 provided on an output shaft of the electric motor 118, a second reduction gear 122 in mesh with the first reduction gear 121, a third reduction gear 123 rotated integrally with the second reduction gear 122, a fourth reduction gear 124 in mesh with the third reduction gear 123, a fifth reduction gear 125 rotated integrally with the fourth reduction gear 124 and a sixth reduction gear 126 in mesh with the fifth reduction gear 125 and pivotally moved along with the shift spindle 87.

The second and the third reduction gears 122 and 123 are provided integrally with a first speed reduction shaft 127 rotatably supported by the front cover 37. The gear case 98 and the fourth and the fifth reduction gears 124 and 125 are provided integrally with a second speed reduction gear 128 rotatably supported by the front cover 37 and the gear case 98. Furthermore, the sixth reduction gear 126 is a sector gear and is fixed to the shift spindle 87.

The gear case 98 is attached with rotational phase detecting means 129 which is a potentiometer and the rotational phase detecting means 129 is connected to a front end of the shift spindle 87.

With reference particularly to FIGS. 4 and 6, the clutch 47 is mounted to one end portion, that is, a front end portion of the input shaft 50 projected from the crankcase 33 into the front operation chamber 40, and is provided with a clutch center 130 rotated around the axial line of the input shaft 50. A plurality of sheets of first clutch plates 131 are in mesh with an outer periphery of the clutch center 130 relatively unrotatably. A plurality of sheets of second clutch plates 132 are arranged to overlap the first clutch plates 132. A clutch drum 133 containing the first and the second clutch plates 131 and 132 and rotated integrally with the input shaft 50 by being brought in mesh with the outer peripheries of the second clutch plates 132 are relatively unrotatable Furthermore, a piston 134 is slidably fitted to the clutch drum 133 by enabling frictional engagement with the first and the second clutch plates 131 and 132.

An outer periphery of a front end portion of the input shaft 50 is fixed with a sleeve 135 coaxially surrounding the input shaft 50. The clutch center 130 is supported relatively rotatably to the sleeve 135 and the clutch drum 133 is fixed to the sleeve 135. The piston 134 is slidably fitted to the clutch drum 133 by being brought into contact with one of the second clutch plates 132 and a hydraulic chamber 136 is formed between the clutch drum 133 and the piston 134. Furthermore, a return spring 137 is provided between the clutch drum 133 and the piston 134 and the piston 134 is urged by a spring in a direction to reduce the volume of the hydraulic chamber 136 by the return spring 137.

In the clutch center 130, a projected end portion of the clutch drum 133 is connected with a driven gear 139 to which power from the torque converter 45 is transmitted via a buffer spring 138. A first one way clutch 140 capable of transmitting power from the input shaft 50 to the clutch center 130 is provided between the sleeve 135 fixed to the input shaft 50 and the clutch center 50 at a position in correspondence with a position between the clutch drum 133 and the driven gear 139 along the axial line direction of the input shaft 50.

The torque converter 45 is mounted to one end portion, that is, a front end portion of the crankshaft 19 projected from the crankcase 33 to the side of the front operation chamber 40. The torque converter 45 is mounted to the crankshaft 19 at a position in correspondence with a position between the front cover 37 and the clutch 47 along the axial line direction of the crankshaft 19. Furthermore, a distance between the input shaft 50 of the gear transmission 46 and the crankshaft 19 is set such that a portion of the clutch 47 overlaps the torque converter 45 when viewed in along the axial line direction of the crankshaft 19.

The torque converter 45 is constructed by a conventionally well-known constitution having a pump 141, a stator 142 and a turbine 143. The pump 141 is fixed to the crankshaft 19. A stator shaft 144 in a cylindrical shape coupled to the stator 142 and coaxially surrounding the crankshaft 19 is supported rotatably relative to the crankshaft 19. A turbine shaft 145 in a cylindrical shape coupled to the turbine 143 and coaxially surrounding the stator shaft 144 is supported rotatably relative to the stator shaft 144.

The turbine shaft 145 is fixedly attached with a driving gear 146 and the driving gear 146 is brought in mesh with the driven gear 139 connected to the clutch center 130 of the clutch 47.

A second one way clutch 148 permitting the stator shaft 144 and the stator 142 to rotate in one direction, is provided between a support member 147 fixed to the front case half 31 of the crankcase 33. The stator shaft 144 and the driving gear 146 are arranged between the second one way clutch 148 and the torque converter 45 along the axial direction of the crankshaft 19. Furthermore, the clutch 47 is mounted to the front end portion of the input shaft 50 in an arrangement in which at least a portion of the clutch drum 133 provided to the clutch 47 is contiguous to a side of the second one way clutch 148 along the axial line direction of the crankshaft 19.

Furthermore, a third one way clutch 150 capable of transmitting power from the turbine shaft 145 to the pump 141 is provided between the pump 141 of the torque converter 45 and the turbine shaft 145 fixed with the driving gear 146.

With reference particularly to FIG. 5, a rotor 152 of a generator 151 is attached to a rear end of the crankshaft 19 projected from the rear case half 32 of the crankcase 33 into the rear operation chamber 41, and a stator 153 of the generator 151 is fixed to the rear cover 39.

A starter gear 154 connected to a starter motor, not illustrated, is supported relatively rotatably by the crankshaft 19 at a position contiguous to the rotor 152 of the generator 151. The starter gear 154 is connected to the rotor 152 via a fourth one way clutch 155. Thereby, when the starter gear 154 is driven by operating the starter motor, the crankshaft 19 can be cranked via the fourth one way clutch 155 and the rotor 152. When the engine E is started by the cranking operation, the fourth one way clutch 155 is brought into a free state and transmission of power from the rotor 152 to the starter gear 154 is cut.

A terminal end of the crankshaft 19 is fixedly attached with a starter wheel 156. A recoil starter 157, claws of which can be engaged with the starter wheel 156, is attached to the rear cover 39. Therefore, the crankshaft 19 can also be cranked by pulling a rope 158 of the recoil starter 157.

A plurality of projections 180 are projected from the outer periphery of the rotor 152. An engine revolution sensor 181 for detecting a revolution of the crankshaft 19 by detecting the projections 180 is attached to the rear cover 39 to be opposed to the projections 180.

In FIG. 9, oil stored in an oil storage 159 formed at a bottom portion in the crankcase 33 is sucked by a scavenging pump 161 driven by the crankshaft 19 via strainer 160. Oil delivered from the scavenging pump 161 is returned to the oil storage 159 via an oil cooler 162 and a first relief valve 163 is connected between the scavenging pump 161 and the oil cooler 162.

The hydraulic type clutch 47 is driven by a second actuator 164 which is independent from the electric motor 118 for driving to shift the gear transmission 46. The second actuator 164 is provided with a hydraulic pump 165 driven by the crankshaft 19. Furthermore, a clutch control valve 166 is for controlling delivery pressure of the hydraulic pump 165 to operate to the hydraulic chamber 136 of the clutch 47.

Oil stored in the oil storage 159 is sucked by the hydraulic pump 165 via the strainer 160 and oil delivered from the hydraulic pump 165 is supplied to the clutch control valve 166 via a second relief valve 167 and an oil filter 168.

The clutch control valve 166 is provided with a valve housing 171 having an input port 169 and an output port 170. A spool 172 is slidably fitted in the valve housing 171 to be able to switch to communicate and cut the input port 169 and the output port 170. A spring 173 is provided between the spool 172 and the valve housing 171 and a linear solenoid 174 coaxially connected to the spool 172. The input port 169 is connected to the oil filter 168 and the output port is connected to the hydraulic chamber 136 of the clutch 47.

The valve housing 171 is provided with a slide hole 175, both ends of which are opened. The spring 173 is provided between a cap 176 closing one end of the slide hole 175 and one end of the spool 172 slidably fitted to the slide hole 175. A rod 174a of the linear solenoid 174 fastened to the valve housing 171 to close other end of the slide hole 175 is brought into contact coaxially with other end of the spool 172.

The spring 173 urges the spool 172 into communication with the input port 169 and the output port 170. Thrust force from the linear solenoid in accordance with input current is exerted from the rod 174a to the spool 172 to move the spool 172 to a side of cutting the input port 169 from the output port 170.

Furthermore, ring-like pressure chambers 176 for applying pressure of the output port 170 are formed between the valve housing 171 and the spool 172. A pressure receiving area of the spool 172 facing the pressure chamber 176 from the side of the linear solenoid 174 is set to be smaller than a pressure receiving area of the spool 172 facing the pressure chamber 172 from the side of the spring 174. Therefore, hydraulic pressure of the pressure chamber 176 is applied to the spool 172 to move the spool 172 into communication with the input port 169 and the output port 170.

According to the clutch control valve 166, hydraulic pressure of the hydraulic pump 165 is controlled and outputted from the output port 170 such that the larger the input current of the linear solenoid 174, the lower the pressure.

As shown by FIG. 4, the valve housing 171 of the clutch control valve 166 is attached to an outer face side of the front cover 37 at a position substantially in correspondence with the clutch 47. An oil supply tube 179 is provided for connecting an oil path 177 and an oil path 178 provided to the front cover 37 to communicate with the output port 170 of the clutch control valve 166 between the front end portion of the input shaft 50 and the front cover 37. The oil path 177 is in communication with the hydraulic chamber 136 of the clutch 47 and coaxially provided to the front end portion of the input shaft 50. The oil supply tube 179 is arranged to extend coaxially with the input shaft 50 at the side of the torque converter 45.

The output port 170 of the clutch control valve 166 is connected with an accumulator 183 and the accumulator 183 is provided with a fixed housing 184. An accumulator piston 186 forms an accumulating chamber 185 in a ring-like shape communicating with the output port 170 between the housing 184 and the piston and slidably fitted to the housing 184. A spring 187 is provided between the housing 184 and the accumulator piston 186 for exerting a spring force to increase the volume of the accumulating chamber 185. Furthermore, a pilot chamber 188 capable of exerting hydraulic force urging the accumulator piston 186 to reduce the volume of the accumulating chamber 185, is formed between the accumulator piston 186 and the housing 184. The pilot chamber 188 is connected to the output port 170 of the clutch control valve 166 via a first orifice 189.

Such accumulator 183 is effectively used in a vehicle having a large generated torque. Accordingly, change in control hydraulic pressure by the clutch control valve 166 can be alleviated by the accumulator 183 and shift shock of the clutch 47 can be alleviated.

Furthermore, the output port 170 of the clutch control valve 166 is connected with an opening and closing valve 190 which is opened in accordance with lowering of hydraulic pressure of the output port 170 to thereby discharge oil in the hydraulic chamber 136 at the clutch 47 to the oil storage 159. By operating the opening and closing valve 190, the clutch 47 can be swiftly operated to cut power transmission.

An outlet of the oil filter 168 is connected to the input port of the clutch control valve 166 and to an input port 192 of a torque converter control valve 191.

The torque converter control valve 191 is provided with a valve housing 194 having the input port 192 and an output port 193. A spool 195 is slidably fitted to the valve housing 194 to be capable of switching to communicate and cut the input port 192 and the output port 193. A spring 196 is provided between the valve housing 194 and one end of the spool 195 for exerting spring force urging the spool 195 to communicate with the input port 192 and the output port 193. Furthermore, a pilot chamber 198 for exerting hydraulic pressure force for urging the spool 195 to cut the input port 192 from the output port 193, is formed between a cap 197 mounted to the valve housing 194. The other end of the spool 195 and the pilot chamber 198 is in communication with the input port 192.

According to the torque converter control valve 191, outputted hydraulic pressure of the hydraulic pump 167 is controlled constantly and is outputted from the output port 193.

As shown by FIG. 4, the valve housing 194 of the torque converter control valve 191 is attached to the front cover 37 at a position substantially in correspondence with the crankshaft 19. The output port 193 is connected to an oil path 199 provided in the crankshaft 19 to communicate with the inside of the torque converter 45 via a second orifice 200 provided in the cover 37. Furthermore, the crankshaft 19 is provided with an oil path 201 for guiding oil discharged from the torque converter 45 to the side of the crankpin 35.

An oil path 202 communicating with the output port 193 of the torque converter control valve 191 is provided at the front cover 137 and the front casing 36 and a third orifice 203 interposed between the front cover 37 and the front casing 36 is interposed in the oil path 202. Furthermore, the oil path 202 is connected to an oil path (not illustrated) in the cylinder head 20 via a fourth orifice 204 and is connected to an oil path 205 (refer to FIG. 5) provided at the rear casing 38. The oil path 205 is connected to an oil path 206 provided at the output shaft 51 of the gear transmission 46 via a fifth orifice 207. Furthermore, oil in the oil path 202 is supplied into the clutch 47 via a sixth orifice 208.

The electric motor 118 for shifting the gear transmission 46 and the linear solenoid 174 of the clutch control valve 166 are controlled by a control unit 208 to cut and connect the clutch 47 in cooperation with the shift operation of the gear transmission 46. The control unit 208 is input with a detection signal of a select position detector 210 for detecting an operating position of a select lever 209 operable to switch the shift position to four of "L," "D," "N" and "R,"
an ON/OFF signal of a power button 211 operable to switch the shift stage of the gear transmission 46 when the select lever 209 is disposed to "D," a detection signal of a throttle sensor 212, and detection signals of a shift position detector 73, a vehicle speed sensor 83, the rotational phase detecting means 129 and the engine revolution sensor 181.

Furthermore, according to the control unit 208, the electric motor 118 is controlled to establish the first speed shift stage G1 of the gear transmission 46 when "L" position is selected by the select lever 209, the electric motor 118 is controlled to establish the second speed shift stage G2 when "D" position is selected by the select lever 209 and the power button 211 is brought into an OFF state, the electric motor 118 is controlled to establish the third speed shift stage G3 of the gear transmission 46 when "D" is selected by the select lever 209 and the power button 211 is brought into an ON state, the electric motor 118 is controlled not to establish any of the shift stages G1 through G3, and GR when "N" position is selected by the select lever 209, and the electric motor 118 is controlled to establish the rear gear train GR by the gear transmission 46 when "R" position is selected by the select lever 209.

Furthermore, although the control unit 208 controls the linear solenoid 174 such that the clutch 47 is brought into a power transmitting state when "L," "D" and "R" positions are selected by the select lever 209, when "N" position is selected by the select lever 209, the control unit 208 controls the linear solenoid 174 such that the clutch 47 is brought into a power cut state.

Furthermore, when the clutch 47 is switched from the power cut state to the power transmitting state when the select lever 209 is operated to switch selection of respective positions of "L," "D," "N" and "R," input current to the linear solenoid 174 and accordingly, hydraulic pressure of the clutch 47 is controlled in consideration of detection signals of the throttle sensor 212, the shift position detector 73, the vehicle speed sensor 83 and the engine revolution sensor 181.

An explanation will now be provided for the operation of the first embodiment. The gear transmission 46 is driven to be shifted by the electric motor 118. The clutch 47 is driven by the actuator 164 which is independent from the electric motor 118. Accordingly, in comparison with a constitution in which the gear transmission 46 and the clutch 47 are mechanically connected by a link mechanism or the like, even when load of the clutch 47 is increased with an increase in the displacement of the engine E, it is not necessary to increase rigidity of a link mechanism or the like and an increase in the weight can be avoided. Furthermore, the load of the clutch 47 does not influence the shift load or shift operation stroke and therefore, the shift operability can be promoted.

Furthermore, according to the gear transmission 46, there is provided the input shaft 50 supported rotatably by the crankcase 33. The clutch 47 operated by hydraulic pressure is mounted to the front end portion of the input shaft 50 projected from the crankcase 33. The clutch control valve 166 constituting a portion of the actuator 164 is provided at the front cover 37 covering the clutch 47 and the torque converter 45 and coupled to the crank case 33. Accordingly, the clutch 47 and the clutch control valve 166 can be arranged at positions proximate to each other and the operational response of the clutch 47 by operation of the clutch control valve 166 can be promoted.

Furthermore, the torque converter 45 is provided at the front end portion of the crankshaft 19, the torque converter control valve 191 for controlling hydraulic pressure operated to the torque converter 45 is provided at the front cover 37. Therefore, both of the clutch control valve 166 and the torque converter control valve 191 are provided at the front cover 37. Thereby, pressure leakage inspection at the two control valves 166 and 191 can be carried out concentratedly on the side of the front cover 37, which can contribute to promotion of productivity.

Furthermore, the clutch control valve 166 s capable of controlling output hydraulic pressure from the output port 170 communicating with the hydraulic chamber 136 of the clutch 47 at a value in correspondence with input current to the linear solenoid 174. Accordingly, hydraulic pressure provided to the clutch 47 can be controlled by controlling the input current to the linear solenoid 47. Therefore, by controlling hydraulic pressure provided to the clutch 47, the operational characteristics of the clutch 47 can be changed. By changing the operational characteristic, wear amounts of the first and the second clutch plates 131 and 132 can be compensated for. Therefore, it is not necessary to provide an adjuster mechanism for the clutch 47.

Furthermore, operation of the linear solenoid 174 provided to the clutch control valve 166 and operation of the electric motor 118 are controlled by the control unit 208. By electrically controlling both of the clutch control valve 166 and the electric motor 118, operation of the clutch 47 in cooperation with shift operation of the gear transmission 46 is facilitated, the clutch 47 can automatically be operated to cut and connect in cooperation with driving to shift the gear transmission 46 by the electric motor 118 and the operational characteristic of the clutch 47 can be changed. Accordingly, shift shock at the clutch 47 can be alleviated.

Furthermore, the clutch 47 arranged at a position shifted from the torque converter 45 along the axial line direction of the crankshaft 19 is mounted at the front end portion of the input shaft 50 to overlap a portion thereof to the torque converter 45 in view from the axial line direction of the crankshaft 19. Therefore, the power transmission apparatus including the gear transmission 46 in the crankcase 33 can be made compact in a direction along the axial line of the crankshaft 19. Furthermore, the clutch 47 can be arranged to be proximate to the side of the crankshaft 19 and the power transmission apparatus can also be restrained from being large-sized in a direction orthogonal to the axial line of the crankshaft 19.

The oil supply tube 179 extended coaxially with the input shaft 50 at the side of the torque converter 45 is provided between the front cover 37 coupled to the crankcase 33 by covering the torque converter 45 and the clutch 47 and one end portion of the input shaft 50. A system of supplying operating oil to the clutch 47 can be constituted by effectively utilizing a space produced at the side of the torque converter 45.

Furthermore, the clutch 47 is provided with the clutch center 130 connected with the driven gear 139. The first clutch plates 131 is in mesh with the outer periphery of the clutch center 130 relatively unrotatably. The second clutch plates 132 are arranged to overlap the first clutch plates 131. The clutch drum containing the first and the second clutch plates 131 and 132 are in mesh with the outer peripheries of the second clutch plates 132 relatively unrotatably and rotated integrally with the input shaft 50. The piston 134 is capable of exerting the hydraulic force for frictionally engaging the first and the second clutch plates 131 and 132. Slidably fitted to the clutch drum 133, the clutch 47 having the clutch drum 133 having a comparatively large diameter can effectively be arranged such that the driven gear 139 and the clutch drum 133 do not interfere with the crankshaft 19 at the position contiguous to the torque converter 45 along the axial line of the crankshaft 19.

Furthermore, the first one way clutch 140 capable of transmitting power from the input shaft 50 to the clutch center 130 is provided between the clutch center 130 and the input shaft 50. Accordingly, power from the side of the gear transmission 46 can be transmitted to the side of the torque converter in braking the engine and power from the side of the gear transmission 46 in braking the engine can be transmitted to the crankshaft 18 by detouring the torque converter 45 by the third one way clutch 150.

Furthermore, the second one way clutch 148 for permitting rotation of the stator 142 of the torque converter 45 in one direction is provided between the stator 142 and the crankcase 33. The driving gear 146 rotated integrally with the turbine 143 of the torque converter 45 is arranged between the second one way clutch 148 and the torque converter 45 along the axial direction of the crankshaft 19. The clutch 47 is mounted to the front end portion of the input shaft 50 in the arrangement in which at least a portion of the clutch drum 133 is contiguous to the side of the second one way clutch 148 along the axial line direction of the crankshaft 19. Therefore, the efficiency of the torque converter 45 can be promoted by permitting idling of the stator 142 by the second one way clutch 148. The second one way clutch 148 having a comparatively small diameter can effectively be arranged at the space produced between the clutch drum 133 and the crankshaft 19 in correspondence with at least a portion of the clutch drum 133.

Figure 10:
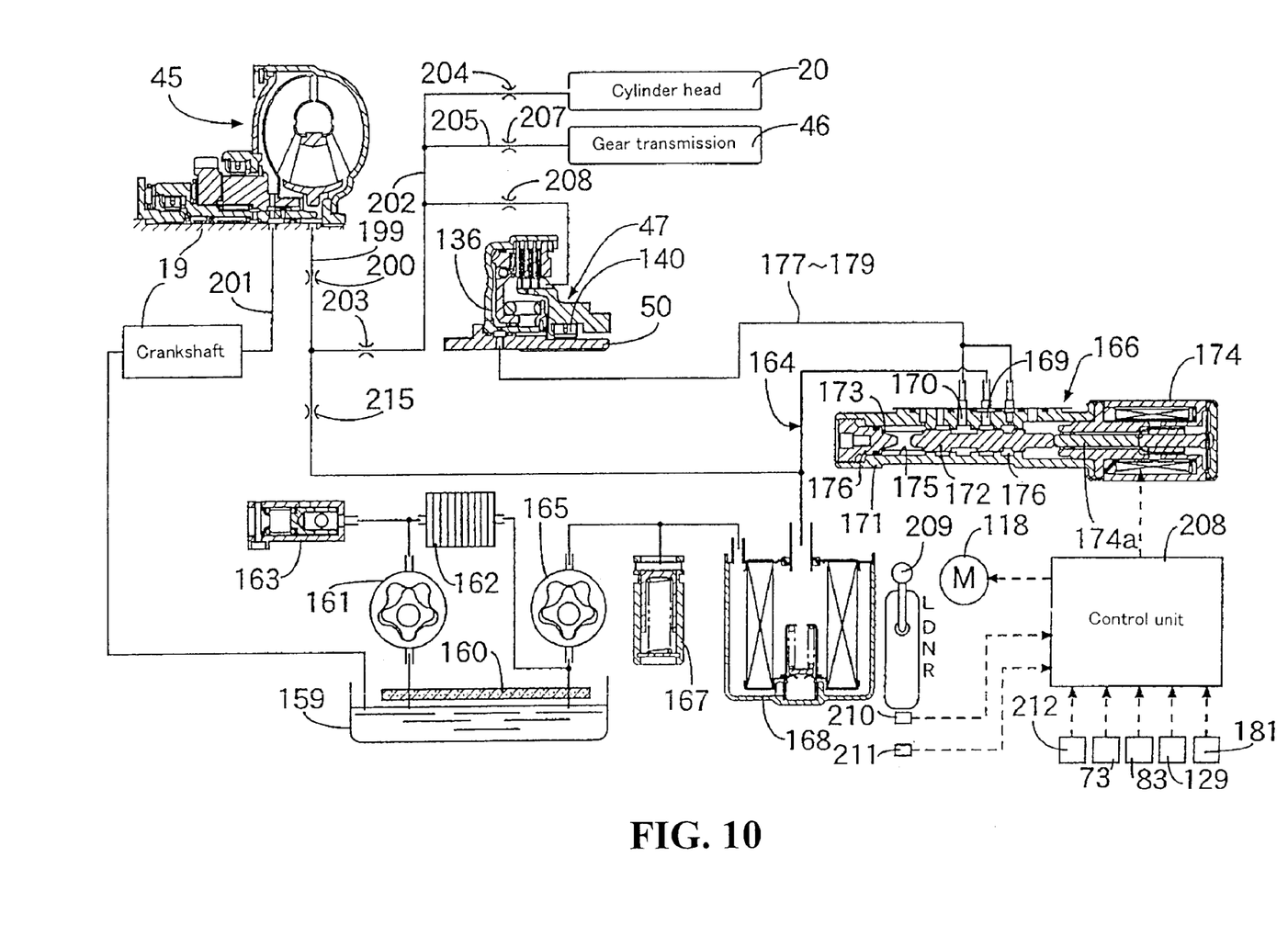
FIG. 10 is a hydraulic circuit diagram of a second embodiment of the present invention in correspondence with FIG. 9.

FIG. 10 shows a second embodiment of the present invention. In applying the present invention to a vehicle having a comparatively small generated torque, the accumulator 183 and the opening and closing valve 150 can be omitted and in place of the torque converter control valve 191, a sixth orifice 215 can be used.

Although a detailed description has been given of the embodiments of the present invention as mentioned above, the present invention is not limited to the above-described embodiments but various design change can be carried out without deviating from the present invention described in the scope of claims.

For example, the present invention is applicable not only to all terrain saddle type vehicles, but is also applicable to a power transmission apparatus for other vehicles having a torque converter, a gear transmission capable of selectively establishing gear trains of a plurality of shift stages and a clutch capable of cutting power transmission between an input shaft of the gear transmission and a turbine of the torque converter.

Furthermore, although according to the above-described embodiments, the clutch 47 is mounted to the front end portion of the input shaft 50 and the torque converter 45 is mounted to the front end portion of the crankshaft 19, the present invention is applicable to a power transmission apparatus in which the clutch 47 is mounted to the rear end portion of the input shaft 50 along the forward and rearward direction of the vehicle and the torque converter 45 is mounted to the rear end portion of the crankshaft 19 along the forward and rearward direction of the vehicle.

As described above, according to the first aspect of the present invention, even when the clutch load is increased in accordance with the increase in the displacement of the engine, the increase in weight can be avoided, the clutch load does not influence on the shift load or the shift operation stroke at the gear transmission. Therefore, the shift operability can be promoted.

Furthermore, according to the second aspect of the present invention, the clutch and the clutch control valve are arranged at positions proximate to each other. Therefore, the operational response of the clutch by operating the clutch control valve can be promoted.

According to the third aspect of the present invention, the clutch control valve and the electric motor are controlled electrically and operation of the clutch in cooperation with the shift operation of the gear transmission is facilitated.

Furthermore, according to the fourth aspect of the present invention, the clutch control valve and the torque converter clutch are provided at the cover, the pressure leakage inspection at the two control valves can be carried out concentratedly on the side of the cover, which can contribute to promotion of productivity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A power transmission apparatus for a vehicle, comprising:
    a gear transmission having a plurality of gear trains, said gear transmission including an input shaft capable of transmitting power from a crankshaft of an engine to driving wheels by selectively establishing one of a plurality of shift stages of the gear trains, said input shaft being rotatably supported by a crankcase of the engine;
    a clutch for cutting power transmission from the crankshaft to the gear transmission when the gear transmission is being operated to shift between gear trains, said clutch being operated by hydraulic pressure and mounted to one end portion of said input shaft projecting from the crankcase;
    a torque converter mountable to one end portion of the crankshaft;
    a cover mounted to the crankcase for covering said clutch and said torque converter;
    a first actuator for shifting the gear transmission;
    a second actuator for driving the clutch independently of the first actuator, said second actuator including a clutch control valve capable of controlling the hydraulic pressure provided to said clutch, said clutch control valve being mounted on said cover; and
    a torque converter control valve for controlling hydraulic pressure provided to said torque converter, said torque converter control valve being provided on said cover.

2. The power transmission apparatus for a vehicle according to claim 1, further comprising:
    a control unit for controlling a solenoid provided in said clutch control valve and for controlling an electric motor, said electric motor constituting said first actuator.

3. The power transmission apparatus for a vehicle according to claim 1, wherein said second actuator further comprises a hydraulic pump drivable by the crankshaft of the engine, wherein said clutch control valve is for controlling delivery pressure of said hydraulic pump to a hydraulic chamber of said clutch.

4. A vehicle, comprising:
    a body frame;
    an engine having a crankshaft rotatably mounted therein, said engine being mounted in said body frame;
    driving wheels mounted for rotation in said body frame; and
    a power transmission apparatus, said power transmission apparatus including:
        a gear transmission having a plurality of gear trains, said gear transmission including an input shaft capable of transmitting power from said crankshaft of said engine to said driving wheels by selectively establishing one of a plurality of shift stages of the gear trains, said input shaft being rotatably supported by a crankcase of said engine;
        a clutch for cutting power transmission from said crankshaft to said gear transmission when said gear transmission is being operated to shift between said gear trains, said clutch being operated by hydraulic pressure and mounted to one end portion of said input shaft projecting from said crankcase;
        a torque converter mounted to one end portion of said crankshaft;
        a cover mounted to said crankcase for covering said clutch and said torque converter;
        a first actuator for shifting said gear transmission;
        a second actuator for driving said clutch independently of said first actuator, said second actuator including a clutch control valve capable of controlling the hydraulic pressure provided to said clutch, said clutch control valve being mounted on said cover; and
        a torque converter control valve for controlling hydraulic pressure provided to said torque converter, said torque converter control valve being provided on said cover.

5. The vehicle according to claim 4, further comprising:
    a control unit for controlling a solenoid provided in said clutch control valve and for controlling an electric motor, said electric motor constituting said first actuator.

6. The vehicle according to claim 4, wherein said second actuator further comprises a hydraulic pump driven by said crankshaft of said engine, wherein said clutch control valve is for controlling delivery pressure of said hydraulic pump to a hydraulic chamber of said clutch.

7. A power unit for a vehicle, comprising:
    an engine having a crankshaft rotatably mounted therein; and
    a power transmission apparatus, said power transmission apparatus comprising:
        a gear transmission having a plurality of gear trains, said gear transmission including an input shaft capable of transmitting power from a crankshaft of an engine to driving wheels by selectively establishing one of a plurality of shift stages of said gear trains, said input shaft being rotatably supported by a crankcase of said engine;
        a clutch for cutting power transmission from the crankshaft to said gear transmission when said gear transmission is being operated to shift between gear trains, said clutch being operated by hydraulic pressure and mounted to one end portion of said input shaft projecting from said crankcase;
        a torque converter mounted to one end portion of said crankshaft;

a cover mounted to said crankcase for covering said clutch and said torque converter;

a first actuator for shifting said gear transmission;

a second actuator for driving said clutch independently of said first actuator, said second actuator including a clutch control valve capable of controlling the hydraulic pressure provided to said clutch, said clutch control valve being mounted on said cover; and a torque converter control valve for controlling hydraulic pressure provided to said torque converter, said torque converter control valve being provided on said cover.

8. The power unit for a vehicle according to claim 7, further comprising:

a control unit for controlling a solenoid provided in said clutch control valve and for controlling an electric motor, said electric motor constituting said first actuator.

9. The power unit for a vehicle according to claim 7, wherein said second actuator further comprises a hydraulic pump drivable by the crankshaft of the engine, wherein said clutch control valve is for controlling delivery pressure of said hydraulic pump to a hydraulic chamber of said clutch.

* * * * *